United States Patent
Kimura et al.

(10) Patent No.: US 7,294,991 B2
(45) Date of Patent: Nov. 13, 2007

(54) METHOD AND APPARATUS FOR CALCULATING/CONTROLLING POWER GENERATION TORQUE

(75) Inventors: Norihito Kimura, Nukata-gun (JP); Katsunori Tanaka, Ichinomiya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 66 days.

(21) Appl. No.: 11/338,809

(22) Filed: Jan. 25, 2006

(65) Prior Publication Data
US 2006/0192533 A1 Aug. 31, 2006

(30) Foreign Application Priority Data

Jan. 25, 2005 (JP) .............................. 2005-016233
Feb. 8, 2005 (JP) .............................. 2005-031730

(51) Int. Cl.
H02P 9/10 (2006.01)
(52) U.S. Cl. ...................... 322/37; 322/27; 322/28; 322/29; 322/33
(58) Field of Classification Search .................. 322/17, 322/22, 27, 28, 29, 33, 37, 45, 59, 99
See application file for complete search history.

(56) References Cited

U.S. PATENT DOCUMENTS 6,900,618 B2    5/2005   Maehara
7,071,656 B2 *  7/2006   Taniguchi ..................... 322/28
7,098,628 B2 *  8/2006   Maehara et al. ............... 322/24
7,170,263 B2 *  1/2007   Yamamoto et al. ........... 322/59
2007/0085512 A1* 4/2007  Maehara ....................... 322/28

FOREIGN PATENT DOCUMENTS

| DE | 100 40 112 A1 | 2/2002 |
| DE | 100 46 631 A1 | 3/2002 |
| DE | 102 00 733 A1 | 7/2003 |
| DE | 103 09 326 A1 | 10/2003 |
| JP | A 2003-074388 | 3/2003 |
| JP | A 2003-244998 | 8/2003 |
| JP | A 2003-284257 | 10/2003 |

OTHER PUBLICATIONS

German Patent and Trademark Office Action w/English-language Translation, May 10, 2007, pp. 1-4.

* cited by examiner

*Primary Examiner*—Nicholas Ponomarenko
(74) *Attorney, Agent, or Firm*—Oliff & Berridge, PLC

(57) ABSTRACT

In an apparatus, a first detecting unit detects the number of revolutions of a power generator, a second detecting unit detects an output voltage of the power generator, and a third detecting unit detects an output current of the power generator. A torque calculating unit calculates power generation torque based on the detected number of revolutions of the power generator, the detected output voltage, and the detected output current using relationship information. The relationship information represents a relationship between the power generation torque and each of the number of revolutions of the power generator, the output voltage, and the output current.

10 Claims, 10 Drawing Sheets

METHOD AND APPARATUS FOR CALCULATING/CONTROLLING POWER GENERATION TORQUE

CROSS REFERENCE TO RELATED APPLICATION

This application is based on Japanese Patent Applications 2005-016233 and 2005-031730 filed on Jan. 25, 2005 and Feb. 8, 2005, respectively. The descriptions of these Patent Applications are all incorporated herein by reference.

BACKGROUND OF THE INVENTION

1. Field of the Invention

The present invention relates to methods and apparatuses for calculating/controlling power generation torque to be used for generating power; this power is supplied to electrical loads of a vehicle, such as a passenger vehicle or a commercial vehicle.

2. Description of the Related Art

In modern vehicles, such as passenger and commercial vehicles, a plurality of electrical loads requiring power have been installed. A power supply system has been used to meet the power requirement of each load installed in a vehicle. The main component of the power supply system is an alternator. The alternator has an exciting winding (field winding) and can regulate an exciting current flowing therethrough so as to control the alternator output (output power). The alternator output is supplied to the loads and a battery in which a DC voltage based on the alternator output is charged.

In such a power supply system, it is important to detect and control power generation torque so as to stabilize rotation of the engine crankshaft of the vehicle.

One example of methods of detecting the power generation torque has been known. The method is to detect the power generation torque based on an exciting current and the number of revolution of an alternator, or the output voltage of the alternator in addition to them. The method is disclosed in the Japanese Unexamined Patent Publications No. 2003-74388 and No. 2003-284257.

The power-generation torque detecting method disclosed in the Patent Publications is for example to:

obtain a relationship between the power-generation torque and the exciting current and/or the alternator rotation to prepare a map representing the obtained relationship;

detect a value of the exciting current or that of the number of revolution of the alternator; and detect a value of the power-generation torque corresponding to the detected value of the exciting current or the number of revolution of the alternator based on the map.

Control of the exciting current based on the detected value of the power-generation torque can prevent the power-generation torque from excessively increasing. In addition, control of the engine using the detected value of the power-generation torque permits the engine speed to be stabilized even with the engine at an idle.

On the other hand, in such a power supply system, various types of energy-saving techniques have been installed. Japanese Unexamined Patent Publication No. 2003-244998 discloses one example of the energy-saving techniques.

In the Patent Publication No. 2003-244998, while throttling down an engine, the output voltage of an alternator is increased so as to forcibly charge a battery depending on the increased voltage. When fuel supply is normally supplied to the engine after the forced charging, reduction in the output voltage of the alternator for a predetermined period allows the alternator not to charge the battery, which causes the forcibly charged voltage to be supplied from the battery to electrical loads.

The predetermined period will be referred to as non-power generation period, the operation mode of the power supply system during the non-power generation period will be referred to as non-power generation mode, and the disclosed energy-saving technique disclosed in the Patent Publication No. 2003-244998 will be referred to as non-power generation regenerative braking technique.

In the power-generation torque detecting method disclosed in the Patent Publications No. 2003-74388 and No. 2003-284257, change in the temperature of stator windings wound around a stator of the alternator is unconsidered. For this reason, there is the possibility that a degree of accuracy for detecting a value of the power-generation torque may be low.

For example, if the stator-winding temperature at the map preparing time is different from that at the time of actually detecting a value of the power-generation torque, the value of the power-generation torque at the map preparing time may be different from that of the power-generation torque at the alternator-torque detecting time even though the values of the exciting current and/or the alternator rotation stay the same.

Particularly, resistances across the stator windings widely depend on the temperature thereof. This may cause the value of the power-generation torque to undergo a great change depending on an amount of the current flowing through the field winding between the map preparing time and the alternator-torque detecting time even though the values of the exciting current and/or the rotation of the rotor stay the same.

On the other hand, in the non-power generation regenerative braking technique disclosed in the Patent Publication No. 2003-244998, while the power supply system operates in the non-power generation mode, the value of the power-generation torque may reach zero because the battery voltage is higher than the output voltage of the alternator. In this state, when instructions to generate a great value of the power-generation torque is input to the power supply system, high inductance of the field winding may make it difficult for the alternator to generate the indicated great value of the power-generation torque. This may cause the alternator's response to torque-change instructions to deteriorate. This may have a negative influence on the realization of a control system for controlling both the power-generation torque and the engine torque to respond to the rapid changes in the vehicle required torque, thereby improving the fuel efficiency.

The problem set forth above may also appear in retuning the power supply system to the torque control mode after causing the alternator not to charge the battery under acceleration.

In order to remedy the problem, the Patent Publication No. 2003-244998 discloses a method of causing the exciting current to flow through the exciting winding within the range in which the power-generation torque is kept to zero during the non-power generation period.

The method, however, may cause return of the power supply system to the torque control mode to be delayed. This may increase waste of current flowing through the exciting winding, causing power loss and the exciting winding to rise in temperature.

SUMMARY OF THE INVENTION

The present invention has been made on the background above. Specifically, an object of at least one preferable embodiment of the present invention provides a method and apparatus for detecting power generator torque, which are capable of improving a degree of accuracy for detecting a value of the power generator torque.

Another object of at least one preferable embodiment of the present invention provides a method and apparatus for controlling power generator torque, which are capable of improving a power generator's response to torque change instructions while carrying out non-power generation control to cause a power generator not to charge a battery.

According to one aspect of the present invention, there is provided an apparatus for calculating power generation torque of a power generator with a portion in which an exciting winding is provided. The power generator generates power based on rotation of the portion while an exciting current is supplied to the exciting winding. The apparatus includes a first unit configured to detect the number of revolutions of the power generator, a second unit configured to detect an output voltage of the power generator, and a third unit configured to detect an output current of the power generator. The apparatus also includes a torque calculating unit configured to calculate power generation torque based on the detected number of revolutions of the power generator, the detected output voltage, and the detected output current using relationship information. The relationship information represents a relationship between the power generation torque and each of the number of revolutions of the power generator, the output voltage, and the output current.

According to another aspect of the present invention, there is provided an apparatus for calculating power generation torque of a power generator with a portion in which an exciting winding is provided. The power generator generates power based on rotation of the portion while an exciting current is supplied to the exciting winding. The apparatus includes a first detecting unit configured to detect the number of revolutions of the power generator, a second detecting unit configured to detect an output voltage of the power generator, and a third detecting unit configured to detect a physical value depending on a temperature of a stator winding. The exciting winding allows magnetic flux to be induced in the stator winding. The apparatus includes a fourth detecting unit configured to detect the exciting current. The apparatus also includes a torque calculating unit configured to calculate power generation torque based on the detected number of revolutions of the power generator, the detected output voltage, the detected exciting current, and the detected physical value using relationship information. The relationship information represents a relationship between the power generation torque and each of the number of revolutions of the power generator, the output voltage, the exciting current, and the physical value with respect to each temperature of the stator winding within a predetermined permissible temperature range.

According to a fiber aspect of the present invention, there is provided an apparatus for calculating power generation torque of a power generator with a portion in which an exciting winding is provided. The power generator generates power based on rotation of the portion while an exciting current is supplied to the exciting winding. The apparatus includes a first detecting unit configured to detect the number of revolutions of the power generator, and a second detecting unit configured to detect an output voltage of the power generator. The apparatus also includes a third detecting unit configured to detect an output current of the power generator, and a fourth detecting unit configured to detect a physical value depending on a temperature of a stator winding. The exciting winding allows magnetic flux to be induced in the stator winding. The apparatus further includes a torque calculating unit configured to calculate power generation torque based on the detected number of revolutions of the power generator, the detected output voltage, the detected output current, and the detected physical value using relationship information. The relationship information represents a relationship between the power generation torque and each of the number of revolutions of the power generator, the output voltage, the output current, and the physical value with respect to each temperature of the stator winding within a predetermined permissible temperature range.

According to a still further aspect of the present invention, there is provided an apparatus for controlling power generation torque of a power generator with a portion in which an exciting winding is provided. The power generator generates power based on rotation of the portion while an exciting current is supplied to the exciting winding. The power is supplied to an electrical load and a battery. The apparatus includes a first unit configured to control the power generator in a first control mode to cause the power generation torque to zero, and a second unit configured to control the exciting current in a second control mode to cause the alternator to generate a value of the power generation torque corresponding to an instruction torque value. The apparatus also includes a third unit configured to shift the power generation torque from zero to a predetermined value based on input information during a transition from the first control mode to the second control mode. The information is associated with an end timing of the control in the first control mode.

According to a still further aspect of the present invention, there is provided a method of calculating power generation torque of a power generator with a portion in which an exciting winding is provided. The power generator generates power based on rotation of the portion while an exciting current is supplied to the exciting winding. The method includes detecting the number of revolutions of the power generator, detecting an output voltage of the power generator, and detecting an output current of the power generator. The method also includes calculating power generation torque based on the detected number of revolutions of the power generator, the detected output voltage, and the detected output current using relationship information. The relationship information represents a relationship between the power generation torque and each of the number of revolutions of the power generator, the output voltage, and the output current.

According to a still further aspect of the present invention, there is provided a method of controlling power generation torque of a power generator with a portion in which an exciting winding is provided. The power generator generates power based on rotation of the portion while an exciting current is supplied to the exciting winding. The power is supplied to an electrical load and a battery. The method includes controlling the power generator in a first control mode to cause the power generation torque to zero, and controlling the exciting current in a second control mode to cause the alternator to generate a value of the power generation torque corresponding to an instruction torque value. The method also includes shifting the power generation torque from zero to a predetermined value based on input information during a transition from the first control mode to the second control mode. The information is associated with an end timing of the control in the first control mode.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings.

First Embodiment

Figure 1:
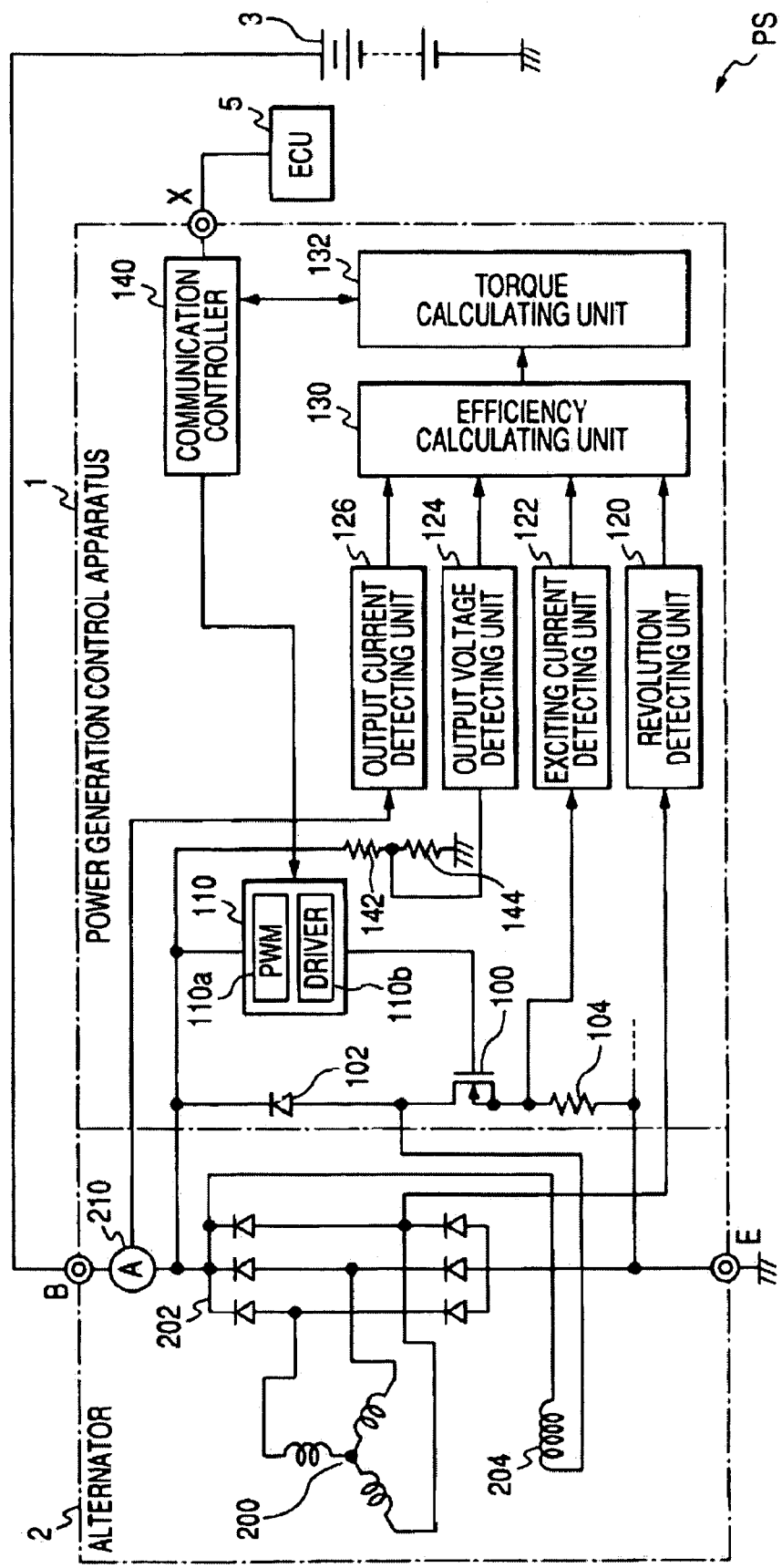
FIG. 1 is a circuit diagram schematically illustrating an example of the circuit structure of a power supply system according to a first embodiment of the present invention.

FIG. 1 illustrates an example of the circuit structure of a power supply system PS, which has been installed in a vehicle, according to the first embodiment of the present invention.

The power supply system PS is provided with a power-generation control apparatus 1, an alternator 2 as an example of power generators, a battery 3, and an electronic control unit ECU) 5. The power-generation control apparatus 1 has a terminal B to which the alternator 2, the battery 3, and electrical loads (not shown) are connected. The terminal B serves as an output terminal of the alternator 2. The power-generation control apparatus 1 also has a ground terminal E serving as, for example, a signal common (signal ground) of the power-generation control apparatus 1 and the alternator 2. The power-generation control apparatus 1 further has a communication terminal X to which the ECU 5 is connected.

The power-generation control apparatus 1 is operative to control the alternator 2 so that a voltage at the terminal B becomes a predetermined regulated voltage (target regulated voltage) set value of, for example, 14 V. In addition, the power-generation control apparatus 1 serves as a torque detecting apparatus for detecting power-generation torque.

The alternator 2 is provided with a field winding (exciting winding) 204 provided in a rotor (not shown). The rotor is coupled to a crankshaft of an engine through a belt to be rotatable therewith.

The alternator 2 is provided with a three-phase stator windings 200 connected in, for example, star configuration and provided in a stator that surrounds the rotor, and a rectifier 202 consisting of, for example, three pairs of positive (high-side) and negative (low-side) diodes connected in the form of a bridge. Specifically, the positive and negative diodes of each pair are connected in series at a connection point, and the connection points of the three paired diodes are connected to lead wires of the three-phase stator windings 200, respectively. The cathodes of the high-side diodes are commonly connected through a current transformer (current sensor) 210 described hereinafter to the output terminal B, and the anodes of the low-side diodes are commonly connected to the ground terminal E. One end of the exciting winding 204 is connected to the cathodes of the high-side diodes.

In the alternator 2, when an exciting current from the battery 3 is applied to the exciting winding 204 of the rotor that is rotating through brushes (not shown) and slip-rings, the rotating field winding 204 create magnetic fluxes. The created magnetic fluxes induce a three-phase AC voltage in the stator windings 200. The rectifier 202 rectifies the induced three-phase AC voltage induced in the stator windings 200 to a direct current (DC) voltage. The rectified DC voltage is output through the output terminal B so that the output DC voltage is supplied to the battery 3 and the electrical loads.

On the other hand, as illustrated in FIG. 1, the power-generation control apparatus 1 includes an exciting current controlling transistor (switching transistor) 100, a flywheel diode 102, a sense resistor 104, and an exciting-current control unit 110. The power-generation control apparatus 1 also includes a revolution detecting unit 120, an exciting current detecting unit 122, an output voltage detecting unit 124, an output current detecting unit 126, an efficiency calculating unit 130, a torque calculating unit 132, and a communication controller 140. The power-generation control apparatus 1 further includes resistors 142 and 144.

The switching transistor 100 is, for example, an N-channel MOSFET whose drain connected to the other end of the exciting winding 204. The source of the switching transistor 100 is connected through the sense resistor 104 to the ground terminal E so that the switching transistor 100 is connected to the exciting winding 204 in series. In other words, the sense resistor 104 is connected between the switching transistor 100 and the ground terminal E. The base of the switching transistor 100 is connected to the exciting-current control unit 110.

When the switching transistor 100 is turned on and kept in the on state, the on-state of the switching transistor 100 allows the exciting current to flow therethrough. The flywheel diode 102 is connected in parallel to the field winding 204. Specifically, the anode of the flywheel diode 102 is connected to the other end of the field winding 204, the cathode of the flywheel diode 102 is connected to the cathodes of the high-side diodes.

When the switching transistor 100 is turned off and kept in the off state, the flywheel diode 102 allows the exciting current to return.

When the exciting current flows through the source and drain of the switching transistor 100, the sense resistor 104 generates a voltage thereacross; this voltage is proportional to the magnitude of the exciting current flowing through the sense resistor 104.

The exciting-current control unit 110 is connected to the ECU 5 through the communication controller 140 and the communication terminal X.

Specifically, the exciting-current control unit 110 is composed of, for example, a PWM (Pulse Width Modulation) signal generator 110a and a driver 110b. The PWM signal generator 110a includes a triangle wave generator and a comparator. The triangle wave generator is configured to generate a triangle wave voltage (a carrier wave voltage). The comparator has a non-inverting input terminal, an inverting input terminal, and an output terminal. The triangle wave voltage is input to the inverting input terminal of the comparator, and a control voltage signal output from the ECU 5 through the communication controller 140 is input to the non-inverting input terminal of the comparator.

The control voltage signal having amplitude information determined by the ECU 5 and corresponding to the target regulated voltage is input to the inverting input terminal of the comparator. This causes the comparator to output a PWM (Pulse Width Modulation) signal, required to control the exciting current. The PWM signal consists of a train of pulses of high and low voltage levels with, for example, a predetermined period. Each pulse of the PWM signal has a variable duty cycle that varies depending on the amplitude information. The PWM signal is amplified by the driver 110b to be input to the base of the switching transistor 100 so that the switching transistor 100 is turned on and off based on the duty cycle of each pulse in the PWM signal. The tuning on and off of the switching transistor 100 allows the exciting current to be on and off so that the alternator output is regulated to approach the target regulated voltage.

The revolution detecting unit 120 is configured to monitor a phase voltage appearing any one of phases of the stator windings 200 to detect the number of revolutions of the alternator 2. For example, assuming that the phase voltage appearing at any one on the phases of the stator windings 200 is referred to as Vp, the phase voltage Vp has, for example, a waveform with a 50% duty cycle and with a frequency proportional to the number of revolutions of the alternator 2. After the phase voltage Vp has been binarized for example, counting the number of pulses per unit of time in the binarized phase voltage Vp allows the frequency of the phase voltage Vp, that is, the number of revolutions of the alternator 2 to be calculated.

The resistors 142 and 144 are connected in series at a connection point, one end of the series-connected resistors 142 and 144 is connected to the output terminal B through the current transformer 210, and the other end thereof is connected to the signal ground. The series-connected resistors 142 and 144 serve as a voltage divider. The connection point of the resistors 142 and 144 is connected to the output voltage detecting unit 124.

Specifically, the output voltage of the alternator 2 at the output terminal B is divided by the voltage divider to be input to the output voltage detecting unit 124. The output voltage detecting unit 124 is configured to detect the output voltage of the alternator 2 based on the input divided-voltage.

The current transformer 210 is designed to have its primary and secondary windings, the primary winding of which is connected in series with the output terminal B. The current transformer 210 is designed to measure an output current from the alternator 2 as an electrically isolated signal proportional to the measured current. The measured electrically isolated signal is input to the output current detecting unit 126. The output current detecting unit 126 is configured to detect the value of the output current of the alternator 2 based on the measured electrically isolated signal.

The efficiency calculating unit 130 is configured to calculate an efficiency $\acute{\eta}$ of the alternator 2 based on the detected number of revolutions of the alternator 2, the detected magnitude of the exciting current, the detected value of the output voltage of the alternator 2, and the detected value of the output current thereof using an approximate equation described hereinafter.

The torque calculating unit 132 is configured to calculate the power-generation torque T using the calculated efficiency $\acute{\eta}$. The communication controller 140 is configured to communicate items of information including the calculated power-generation torque T, a torque control enable signal, and the control voltage signal between the power-generation control apparatus 1 and the ECU 5 using, for example a predetermined serial communication protocols.

The power-generation control apparatus 1 can be configured as a digital-analog integrated system such that at least the efficiency calculating unit 130 and the torque calculating unit 132 can be implemented as functions of a programmed microcomputer.

Next, operations of the power-generation control apparatus 1 will be described hereinafter, focusing on operations of the efficiency calculating unit 130 and the torque calculating unit 132.

When the control voltage signal output from the ECU 5 through the communication controller 140 is input to the exciting-current control unit 110, the PWM signal is output from the exciting-current control unit 110 to be input to the base of the switching transistor 100. The PWM signal allows the switching transistor 100 to be turned on and off based on the duty cycle of each pulse therein, causing the exciting current to be on and off. This allows the alternator output to be regulated to approach the target regulated voltage.

On the other hand, the output current, the output voltage, the exciting current, and the number of revolutions of the alternator 2 are detected by the output current detecting unit 126, the output voltage detecting unit 124, the exciting cent detecting unit 122, and the revolution detecting unit 120, respectively.

The output current to which reference character I will be attached hereinafter of the alternator 2 can be expressed as functions of the temperatures of the stator windings 200, the exciting winding 204, the rotor core, and the stator core. Using the output current I of the alternator 2 in detecting the power-generation torque to which reference character T will be attached hereinafter allows the power-generation torque T to be calculated with consideration of their temperature variations.

The calculation of the efficiency $\acute{\eta}$ of the alternator 2 is carried out by the efficiency calculating unit 130 using an approximate equation as follows:

$$\text{Efficiency } \eta = OUTPUT / (OUTPUT + LOSS) \quad \text{[Equation 1]}$$

$$= VI / \{VI + (AP + BI_f^2 + CNI_f^2 + DN^2 I_f^2 + EN + FI_f + GI)\}$$

Where N represents the number of revolutions of the alternator 2, $I_f$ represents the exciting current, and $AI^2$ represents the term proportional to the second order of the output current I corresponding to copper loss in the stator windings 200. In addition, $BI_f^2$ represents the term proportional to the second order of the exciting current $I_f$ corresponding to copper loss in the exciting winding 204, and $CNI_f^2$ represents the term proportional to the first order of the revolution N and the second order of the exciting current $I_f$ corresponding to hysteresis less in core loss.

Moreover, $DN^2 I_f^2$ represents the term proportional to the second order of the revolution N and that of the exciting current $I_f$ corresponding to eddy-current loss in the core loss, and EN represents the term proportional to the first order of the revolution N corresponding to the first-order component of mechanical loss.

Furthermore, $FI_f$ represents the term proportional to the first order of the exciting current $I_f$ corresponding to electrical loss in the brush contact surfaces of the alternator 2, and GI represents the term proportional to the first order of the output current I corresponding to rectifier loss. Note that V represents the output voltage.

The above unknown A to G are considered as alternator-specific constants. For this reason, the equation 1 is an approximate equation of the efficiency $\acute{\eta}$ that establishes itself on given values of the output voltage V, the output current I, the exciting current $I_f$, and the revolution N.

Specifically, when the value (rpm) of the revolution N is detected by the revolution detecting unit 120, the value of the exciting current $I_f$ is detected by the exciting current detecting unit 122, the output voltage V is detected by the output voltage detecting unit 124, and the output current I is detected by the output current detecting unit 126, the efficiency calculating unit 130 calculates the efficiency $\acute{\eta}$ corresponding to the detected values based on the equation 1.

Note that the approximate equation of the efficiency $\acute{\eta}$ is not limited to the equation 1. Depending on the structures of power generators (alternators) to which the present invention is applied, various modifications, such as addition of another term to the equation 1, or deletion of at least one of the terms therefrom can be made to the equation 1. For example, a term proportional to the second order of the revolution N corresponding to the second-order component of mechanical loss can be added to the equation 1. If the present invention is applied to a brush-less alternator, the term proportional to the first order of the exciting current $I_f$ can be deleted from the equation 1.

For example, if the efficiency calculating unit 130 can be implemented as functions of a programmed microcomputer, data indicative of the equation 1 has been stored in a memory of the microcomputer or the equation 1 has been described in a program to be executed by the microcomputer to calculate the efficiency $\acute{\eta}$.

Next, the torque calculating unit 132 assigns the calculated efficiency $\acute{\eta}$ to the following equation 2, thereby calculating the power-generation torque T:

$$T = (60 \times V \times I) / (2\pi \times N \times \acute{\eta}) \quad \text{[Equation 2]}$$

For example, if the torque calculating unit 132 can be implemented as functions of a programmed microcomputer, data indicative of the equation 2 has been stored in a memory of the microcomputer or the equation 2 has been described in a program to be executed by the microcomputer to calculate the power-generation torque T.

The power-generation torque T calculated by the torque calculating unit 132 is sent therefrom to the ECU 5 through the communication controller 140. The ECU 5 determines the amplitude information of the control voltage signal in consideration of the power-generation torque T so as to control the exciting current, thereby matching the output voltage of the alternator 2 with the target regulated voltage.

As described above, the power-generation control apparatus 1 according to the first embodiment of the present invention can calculate the efficiency $\acute{\eta}$ and the power-generation torque T in consideration of the output current I depending on the temperature of the stator windings 200. This makes it possible to improve the accuracy of detecting the power-generation torque T that varies depending on the temperature of the stator windings 200. In addition, calculation of the efficiency $\acute{\eta}$ using the approximate equation 1 permits, as compared with calculation of the efficiency $\acute{\eta}$ using the limited number of maps or tables by interpolation, reduction of interpolation error to improve the detection accuracy, and shortening time required to interpolation.

Second Embodiment

Figure 2:
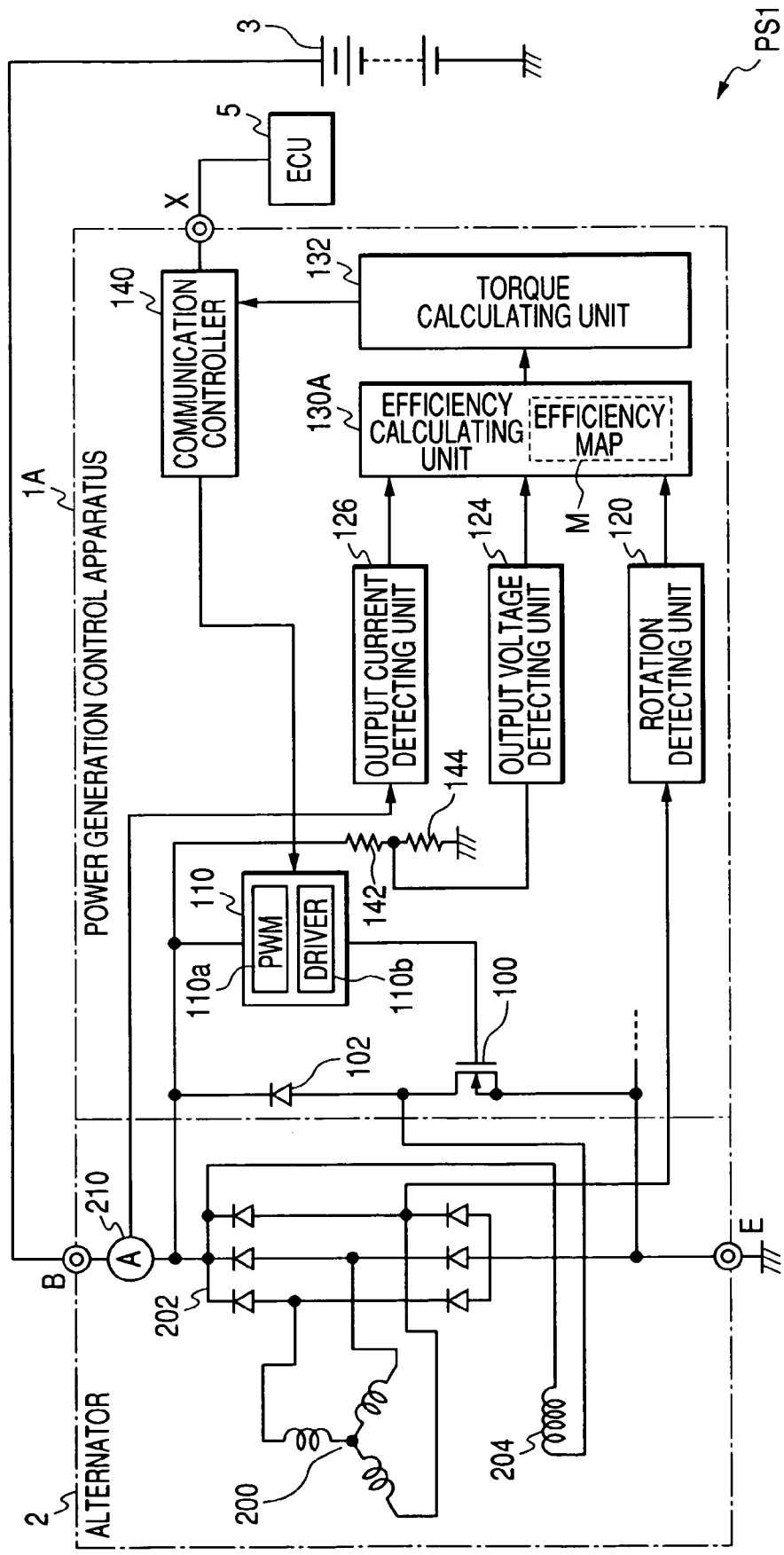
FIG. 2 is a circuit diagram schematically illustrating an example of the circuit structure of a power supply system according to a second embodiment of the present invention.

FIG. 2 illustrates an example of the circuit structure of a power supply system PS1, which has been installed in a vehicle, according to a second embodiment of the present invention.

As compared with the structure of the apparatus 1, a power-generation control apparatus 1A of the system PS1 includes no exciting current detecting unit and sense resistor, and also includes an efficiency calculating unit 130A in place of the efficiency calculating unit 130.

Note that elements of the power supply system PS1 according to the second embodiment, which are substantially identical to those of the power supply system PS according to the first embodiment shown in FIG. 1, are represented by the same reference characters as in FIG. 1. The descriptions of the elements of the power supply system PS1 according to the second embodiment are therefore omitted or simplified.

The efficiency calculating unit 130A has stored therein an efficiency map (map data) M. The efficiency map M includes information of, for example, two or three dimensional curves representing relationships between values of the efficiency $\acute{\eta}$ and each of the revolution N, the output voltage V, and the output current I. The relationships between values of the efficiency $\acute{\eta}$ and each of the revolution N, the output voltage V, and the output current I have been measured to be generated as the efficiency map M. In addition, the efficiency map M (the relationships) has been optimized in consideration of various losses represented as the terms in the equation 1. Because the efficiency map M has already considered the various losses depending on the exciting current, the exciting current is not used to a parameter required to generate the efficiency map M, and therefore the sense resistor 104 and the exciting current detecting unit 122 have been omitted from the apparatus 1A.

Specifically, when given values of the revolution N, the output voltage V, and the output current I are detected to be input to the efficiency calculating unit 130A, the efficiency calculating unit 130A refers to the efficiency map M and calculates one of the values of the efficiency η corresponding to the input values of the revolution N, the output voltage V, and the output current I.

For example, if the efficiency calculating unit 130A can be implemented as functions of a programmed microcomputer, the efficiency map M has been stored in a memory of the microcomputer.

Like the first embodiment, the torque calculating unit 132 assigns the calculated efficiency η to the equation 2, thereby calculating the power-generation torque T.

As described above, the power-generation control apparatus 1A according to the second embodiment of the present invention can calculate the efficiency η and the power-generation torque T in consideration of the output current I depending on the temperature of the stator windings 200. This makes it possible to improve the accuracy of detecting the power-generation torque T that varies depending on the temperature of the stator windings 200.

In the second embodiment, the efficiency calculating unit 130A uses the efficiency map M to calculate the efficiency of the alternator 2, but the present invention is not limited to the structure.

Figure 3:
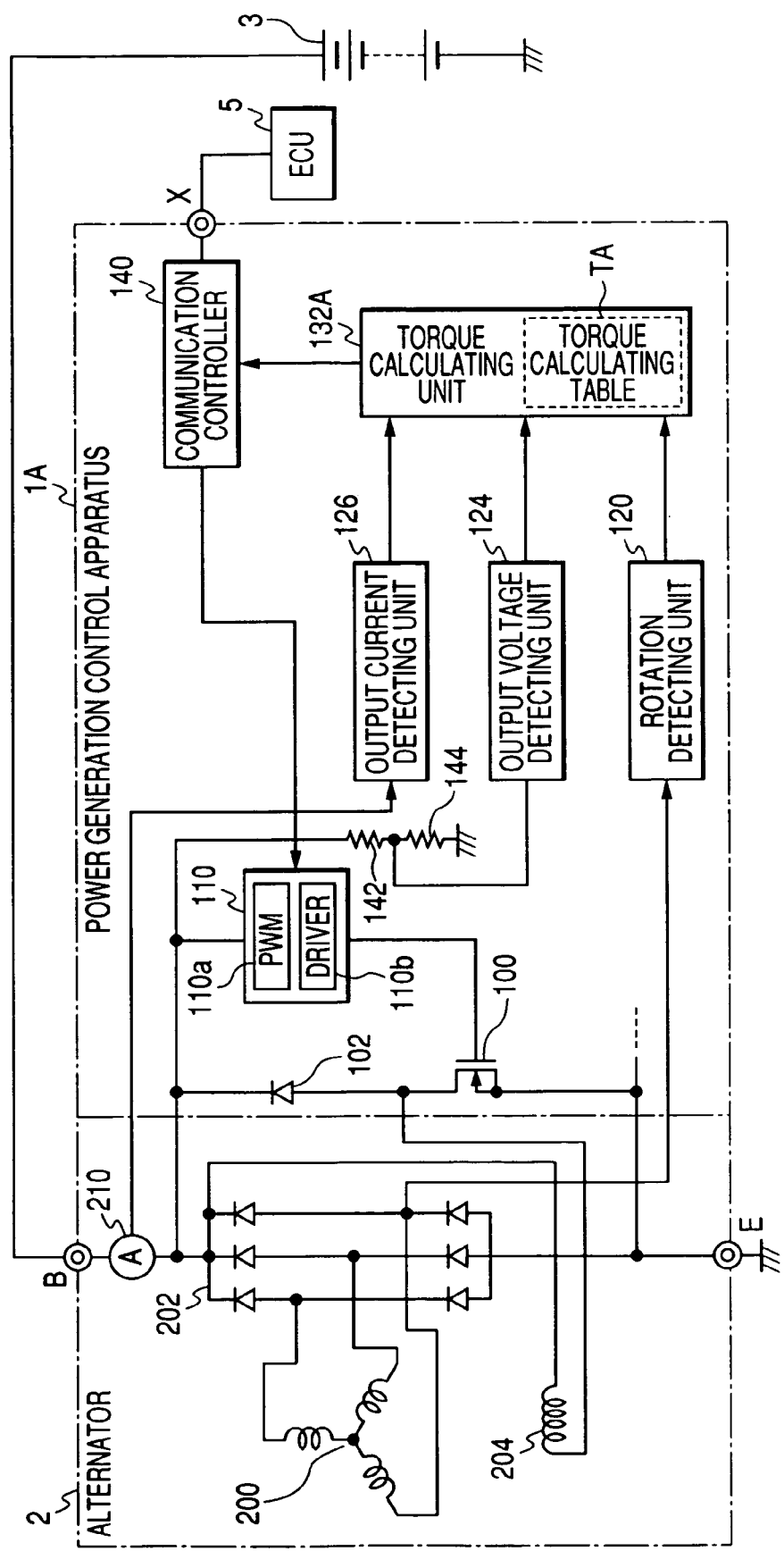
FIG. 3 is a circuit diagram schematically illustrating an example of the circuit structure of a power supply system according to modification of the second embodiment of the present invention.

Specifically, as illustrated in FIG. 3, the torque calculating unit 132B has stored therein a torque calculating table TA in place of the efficiency map M illustrated in FIG. 2. The torque calculating table TA includes information representing relationships between values of the power-generation torque T and each of the revolution N, the output voltage V, and the output current I. The relationships between values of the power-generation torque T and each of the revolution N, the output voltage V, and the output current I have been measured to be generated as the torque calculating table TA. Like the efficiency map M, the torque calculating table has been optimized in consideration of various losses represented as the terms in the equation 1. Because the torque calculating table TA has already considered the various losses depending on the exciting current, the exciting current is not used to a parameter required to generate the torque calculating table TA, and therefore the sense resistor 104 and the exciting current detecting unit 122 have been omitted from the apparatus 1A.

In addition, the efficiency calculating unit 130 has been omitted from the apparatus 1A so that the detected revolution N, the detected output voltage V, and the detected output current I are directly sent to the torque calculating unit 132A.

Specifically, when given values of the revolution N, the output voltage V, and the output current I are detected to be input to the torque calculating unit 132, the torque calculating unit 132A refers to the torque calculating table TA. Then, the torque calculating unit 132A directly calculates one of the values of the power-generation torque T corresponding to the input values of the revolution N, the output voltage V, and the output current I.

This makes it possible to simplify the power-generation torque calculating operations as compared with the power-generation torque calculating operations after calculating the efficiency η.

Third Embodiment

Figure 4:
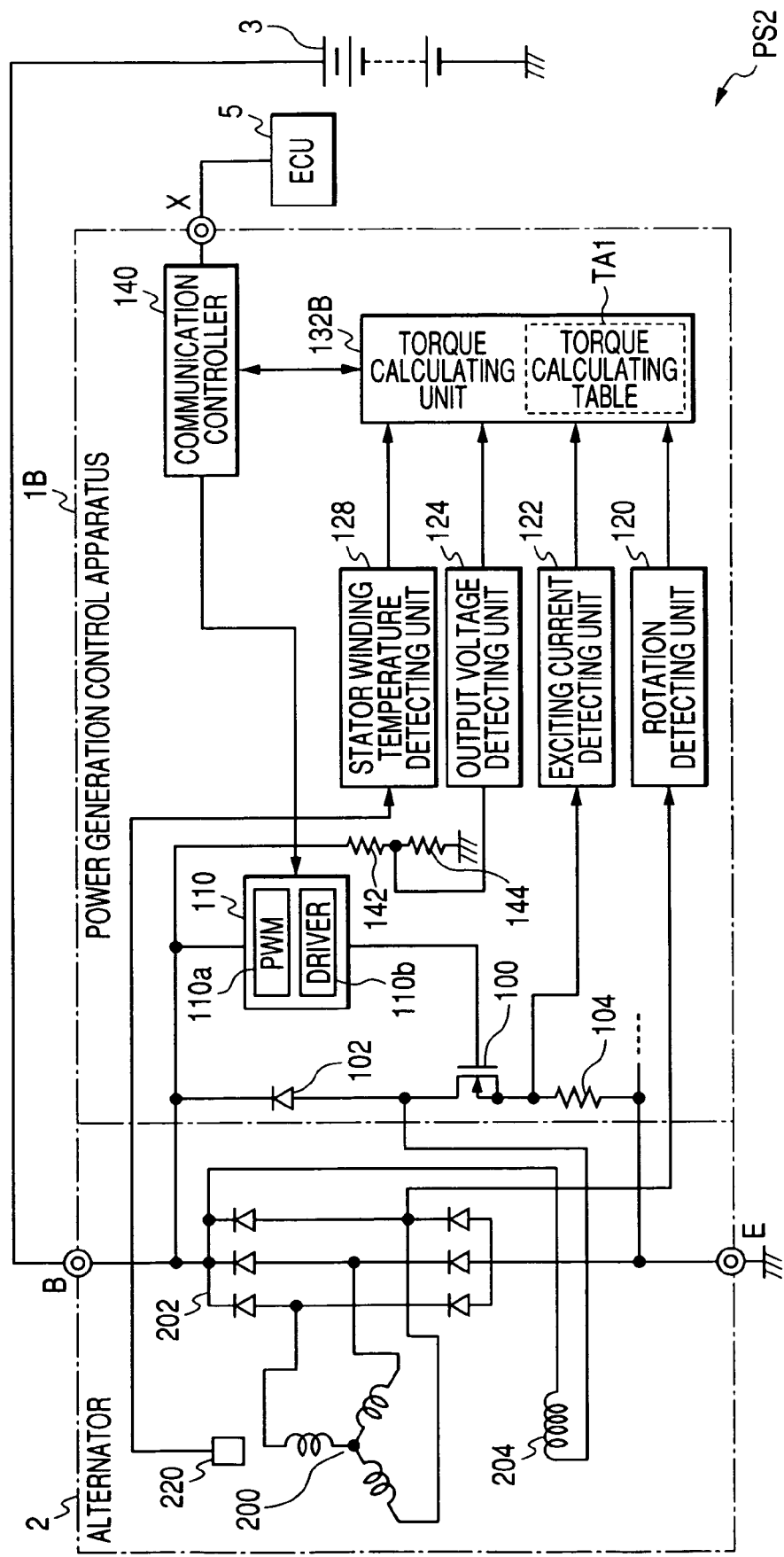
FIG. 4 is a circuit diagram schematically illustrating an example of the circuit structure of a power supply system according to a third embodiment of the present invention.

FIG. 4 illustrates an example of the circuit structure of a power supply system PS2, which has been installed in a vehicle, according to a third embodiment of the present invention.

As compared with the structure of the apparatus 1, a power-generation control apparatus 1B of the system PS2 includes no efficiency calculating unit 130.

In addition, the power-generation control apparatus 1B includes a temperature sensor 220 in place of the current sensor 210, a stator-winding temperature detecting unit 128 in place of the output current detecting unit 126, and a torque calculating unit 132B in place of the torque calculating unit 132.

Note that elements of the power supply system PS2 according to the third embodiment, which are substantially identical to those of the power supply system PS according to the first embodiment shown in FIG. 1, are represented by the same reference characters as in FIG. 1. The descriptions of the elements of the power supply system PS2 according to the third embodiment are therefore omitted or simplified.

The temperature sensor 220 is disposed close to or directly to the stator windings 200, and the stator-winding temperature detecting unit 128 is configured to detect the temperature of the stator windings 200 based on information indicative of the temperature of the stator windings 200 and detected by the temperature sensor 220. For example, the temperature sensor 220 can be attached to a component of the alternator 2, which varies in temperature like the stator windings 200, such as the stator core.

The torque calculating unit 132B has stored therein a torque calculating table TA1. The torque calculating table TA1 includes information representing relationships between values of the power-generation torque T and each of the revolution N, the exciting current $I_f$, and the output voltage V with respect to each temperature of the stator windings 200 within a predetermined permissible temperature range. The relationships between values of the power-generation torque T and each of the revolution N, the exciting current $I_f$, and the output voltage V have been measured while changing the temperature of the stator winding 200 as variable to be generated as the torque calculating table TA1 depending on the temperature of the stator winding 200.

Specifically, when given values of the temperature of the stator winding 200, the revolution N, the exciting current $I_f$, and the output voltage V are detected by the units 128, 120, 122, and 124, the detected values are input to the torque calculating unit 132B.

The torque calculating unit 132B refers to the torque calculating table TA1. Then, the torque calculating unit 132B directly calculates one of the values of the power-generation torque T corresponding to the input values of the temperature of the stator winding 200, the revolution N, the exciting current $I_f$, and the output voltage V.

Specifically, in a conventional manner for detecting power-generation torque, the power-generation torque is detected based on detected values of the number of revolutions of the alternator, the exciting current, and the output voltage without considering the temperature of the stator windings. This may deteriorate the accuracy of detecting the power-generation torque.

However, in the third embodiment, because the power-generation control apparatus 1B can accurately detect the power-generation torque depending on the temperature of the stator windings 200, making it possible to improve the accuracy of detecting the power-generation torque.

As a modification, the components of the temperature sensor 220 and the stator-winding temperature detecting unit 128 can be provided in the structure of the power supply system illustrated in FIG. 3. In this structure, the torque calculating table TA1 can include information representing relationships between values of the power-generation torque T and each of the revolution N, the output current I, and the output voltage V with respect to each temperature of the stator windings 200 within a predetermined permissible temperature range.

Specifically, when given values of the temperature of the stator winding 200, the revolution N, the output current I, and the output voltage V are detected by the units 128, 120, 126, and 124, the detected values are input to the torque calculating unit 132B.

The torque calculating unit 132B refers to the torque calculating table TA1 to directly calculate one of the values of the power-generation torque T corresponding to the input values of the temperature of the stator winding 200, the revolution N, the output current I, and the output voltage V. The modification has therefore the usual effects of the third embodiment.

Fourth Embodiment

Figure 5:
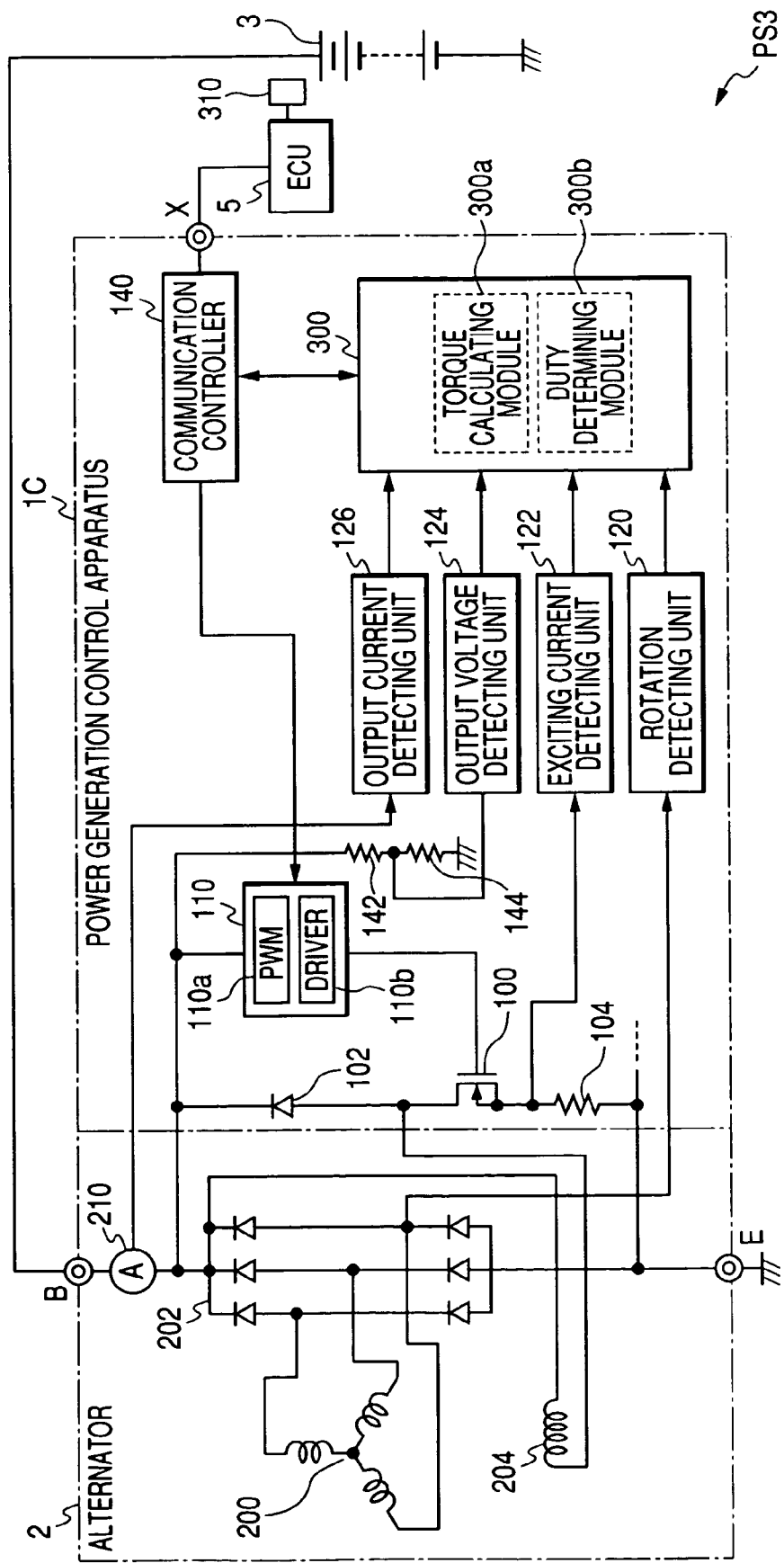
FIG. 5 is a circuit diagram schematically illustrating an example of the circuit structure of a power supply system according to a fourth embodiment of the present invention.

FIG. 5 illustrates an example of the circuit structure of a power supply system PS3, which has been installed in a vehicle, according to a fourth embodiment of the present invention.

As compared with the structure of the apparatus 1, a power-generation control apparatus 1C of the system PS3 includes a computing unit 300 in place of the efficiency calculating unit 130 and the torque calculating unit 132, and a current transformer (current sensor) 310 disposed close to the output terminal of the battery 3 and connected to the ECU 5.

Note that elements of the power supply system PS3 according to the fourth embodiment, which are substantially identical to those of the power supply system PS according to the first embodiment shown in FIG. 1, are represented by the same reference characters as in FIG. 1. The descriptions of the elements of the power supply system PS3 according to the fourth embodiment are therefore omitted or simplified.

The computing unit 300 is configured to, for example, a microcomputer.

The computing unit 300 is operative to control the output power of the alternator 2 based on at least one of the values of the revolution, the exciting current, the output voltage, and the output current detected by the units 120, 124, 126, and 128.

Specifically, the computing unit 300 includes a torque calculating module 300a having functions of the effective calculating unit 130 and the torque calculating unit 132. Namely, the torque calculating module 300a is programmed to calculate the efficiency $\acute{\eta}$ based on the detected values of the revolution, the exciting current, the output voltage, and the output current using the approximate equation 1. In addition, the torque calculating module 300a is programmed to assign the calculated efficiency $\acute{\eta}$ to the equation 2, thereby calculating the power-generation torque T.

Moreover, the computing unit 300 includes a duty determining module 300b as an example of power-generation control modules programmed to:

compare the calculated value of the power-generation torque with an instruction of torque value sent from the ECU 5;

adjust the amplitude information of the control voltage signal corresponding to the current duty cycle of the PWM signal so as to eliminate the difference between the calculated value of the power-generation torque and the instruction torque value based on the compared result; and apply the adjusted amplitude information to the PWM signal generator 110a of the exciting-current control unit 110, thereby controlling the exciting current to match the output voltage of the alternator 2 with the target regulated voltage.

That is, the computing circuit 300 according to the fourth embodiment employs feedback PWM control of the exciting current based on the power-generation torque.

Note that, because the power-generation torque has the strong correspondence to the stator current flowing through the stator windings 200 of the alternator 2, the computing unit 300 can carry out power-generation control using the values of the stator current flowing through the stator windings 200.

Specifically, the duty determining module 300b can be programmed to:

convert the instruction torque value sent from the ECU 5 into an instruction stator current value;

compare the value of the stator current flowing through the stator windings 200 based on the calculated value of the power-generation torque with the instruction stator current value;

adjust the amplitude information of the control voltage signal corresponding to the current duty cycle of the PWM signal so as to eliminate the difference between the value of the stator current flowing through the stator windings 200 based on the calculated value of the power-generation torque and the instruction stator current value based on the compared result; and apply the adjusted amplitude information to the PWM signal generator 110a of the exciting-current control unit 110, thereby controlling the exciting current to match the output voltage of the alternator 2 with the target regulated voltage.

The current transformer 310 is designed to have its primary and secondary windings, the primary winding of which is connected in series with the ECU 5. The current transformer 310 is designed to measure a charging current into the battery 3 and a discharging current from the battery 3 as an electrically isolated signal proportional to the measured current. The measured electrically isolated signal is input to the ECU 5.

The ECU 5 is configured to integrate the measured input current such that, when the measured input signal corresponds to the charging current, the magnitude of the measured input signal is a positive value, and when the measured input signal corresponds to the discharging current, the magnitude of the measured input signal is a negative value. This allows the State of Charge (SOC) of the battery 3 to be calculated. The SOC represents the amount of power left in the battery 3, which is expressed as a percentage of the capacity of the battery 3.

Next, specific operations of the computing circuit 300 will be described hereinafter.

Figure 6:
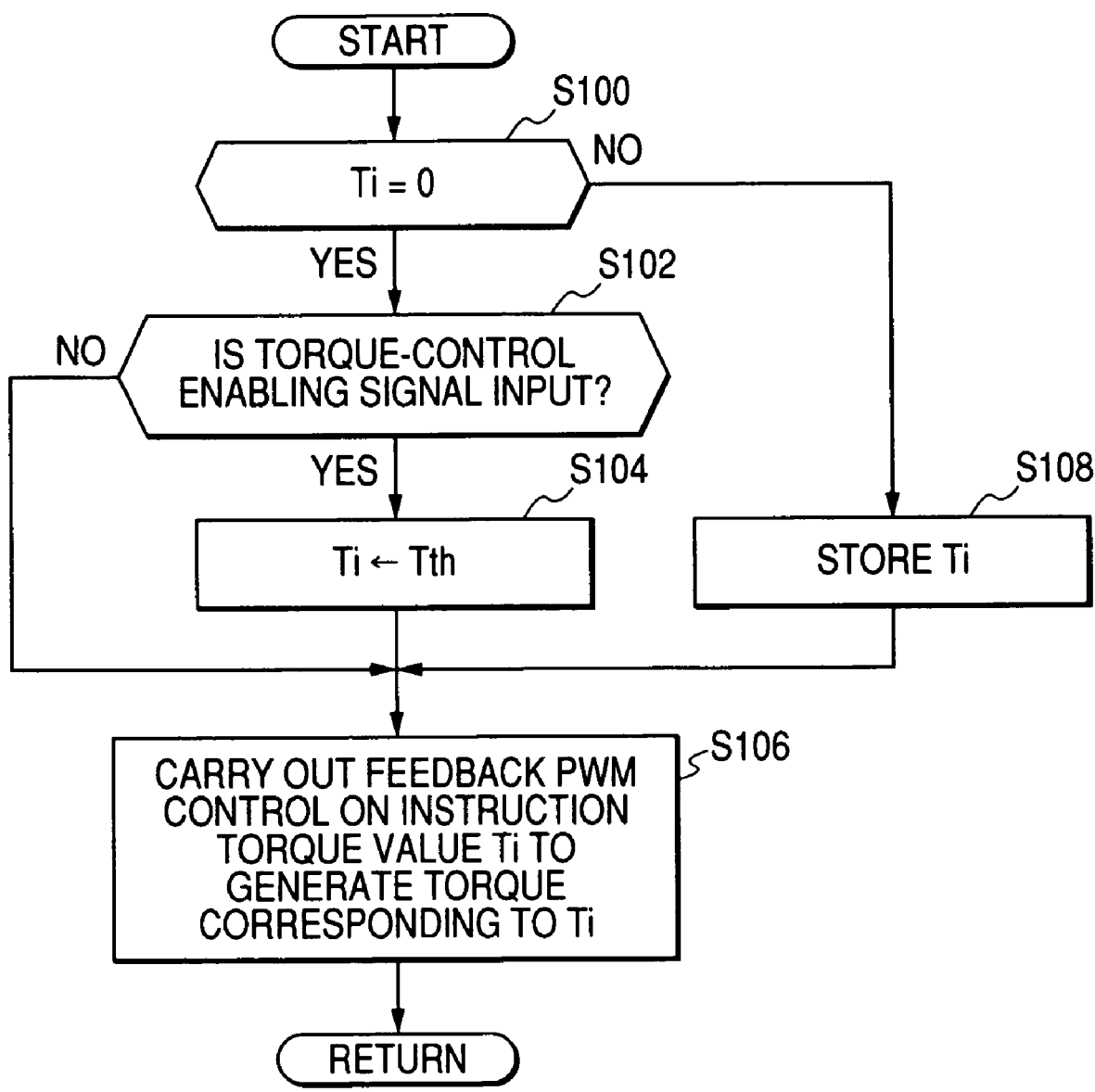
FIG. 6 is a flowchart schematically illustrating a sub routine executed by a computing unit illustrated in FIG. 5.

FIG. 6 is a flowchart schematically illustrating a sub routine executed by the computing unit 300, which correspond to the torque calculating module 300a and the duty determining module 300b. The sub routine is periodically called from the main routine executed by the computing unit 300, and communications between the computing unit 300 and the ECU 5 through the communication controller 140 are also periodically carried out.

Specifically, when receiving the instruction of torque value sent from the ECU 5, the computing unit 300 determines whether the instruction torque value is set to zero, in other words, the power supply system PS3 (alternator 2) operates in the non-power generation mode in step S100.

If it is determined that the instruction torque value is set to zero (the power supply system PS3 (alternator 2) operates in the non-power generation mode) (the determination in step S100 is YES), the computing unit 300 determines whether a torque-control enabling signal is input in step S102.

If it is determined that no torque-control enabling signal is input to the computing unit 300 (the determination in step S102 is NO), the computing unit 300 proceeds to step S106 while keeping the instruction torque value Ti to zero.

In contrast, if it is determined that the torque-control enabling signal is input to the computing unit 300 (the determination in step S102 is YES), the computing unit 300 sets the instruction torque value Ti to a predetermined small threshold torque value Tth in step S104, going to step S106. Note that the small threshold torque value Tth is set to be higher than zero, and equal to or lower than at least 40 percent of the rated maximum load torque value of the alternator 2 corresponding to the rated maximum output current value thereof. Preferably, the small threshold torque value Tth is set to be higher than zero, and equal to or lower than 30 percent of the rated maximum load torque value of the alternator 2.

On the other hand, when it is determined that the instruction torque value Ti is set to a value except for zero (the determination in step S100 is NO), the computing unit 300 determines the received instruction torque value Ti sent from the ECU 5 as a current instruction of torque value in step S108. Then, the computing unit 300 stores the instruction torque value Ti therein in step S108, going to step S106.

In step S106, the computing unit 300 carries out the described feedback PWM control based on the instruction torque value Ti so as to generate power-generation torque (load torque) corresponding to the instruction torque value Ti.

Specifically, the computing unit 300 compares the calculated value of the power-generation torque with the instruction torque value Ti. Next, the computing unit 300 adjusts the amplitude information of the control voltage signal corresponding to the current duty cycle of the PWM signal so as to eliminate the difference between the calculated value of the power-generation torque and the instruction torque value Ti based on the compared result. Subsequently, the computing unit 300 applies the adjusted amplitude information to the PWM signal generator 110a of the exciting-current control unit 110, thereby controlling the exciting current to set the power-generation torque to the instruction torque value Ti. Thereafter, the computing unit 300 returns to the main routine.

Next, specific torque indication control executed by the ECU 5 will be described hereinafter. In the fourth embodiment, the ECU 5 periodically gives, to the apparatus 1C, an instruction torque value for generating power-generation torque (load torque), and the power-generation control apparatus 1C controls the alternator 2 to generate the power-generation torque corresponding to the instruction torque value.

Note that the torque supplied from the engine to the alternator 2, which is strictly considered as load torque, exactly includes power loss torque and mechanical loss torque caused in the alternator 2 itself in addition to the alternator torque. In the fourth embodiment, however, the alternator torque is regarded as the load torque.

Control of power-generation torque based on the instruction torque value sent from the ECU 5 allows the ECU 5 to have means for controlling the output power of the alternator 2 in addition to means for controlling fuel supply in control of running torque applied from the engine to the wheels or in control of the state variables of the engine, such as the engine speed. This can realize torque control, in other words, torque-base control for generating the running torque with high and detailed response to the driver's demands in a power generation and consumption system including the engine and the alternator.

Note that a feature of the fourth embodiment relates to power-generation control of the alternator 2 for a transition period from a non-power generation period set forth above to a torque control period. Operations of the ECU 5 will be therefore focused on operations thereof performed for the transition period and its vicinity thereof hereinafter. Determining operations of a sending timing of the instruction for shifting the non-power generation mode, in other words, the instruction of torque value Ti of zero are therefore omitted. In addition, determining operations of regenerated energy, specifically increasing amount of the instruction torque value Ti and its increasing timing, in regenerative control, specifically, increase of the instruction torque value Ti during a deceleration period before the non-power generation period are omitted.

Figure 7:
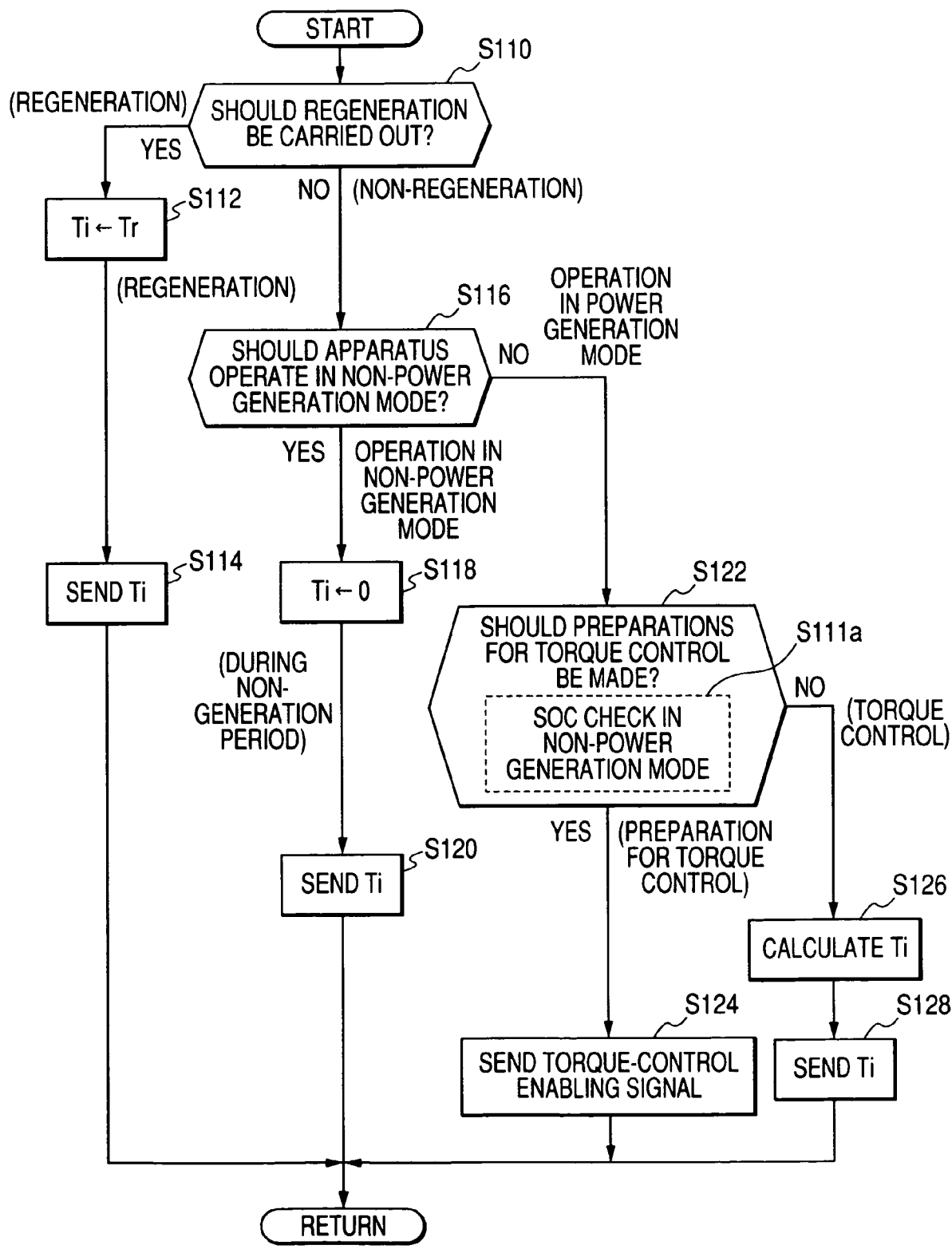
FIG. 7 is a flowchart schematically illustrating a power-generation control routine of an ECU illustrated in FIG. 5.

FIG. 7 is a flowchart schematically illustrating a power-generation control routine of the ECU 5, in other words, a torque-instruction control routine thereof to the power-generation control apparatus 1C. Note that, in the fourth embodiment, "regeneration" means operations of the ECU 5 to set the instruction torque value to be higher than a normal value to generate a stator current from the alternator 2 higher than a consumption current value of the electrical loads. In addition, the operation mode of the ECU 5 carrying out the regeneration will be referred to as regeneration mode.

Specifically, the ECU 5 determines whether regeneration should be carried out in step S110 of FIG. 7. In the fourth embodiment, to the ECU 5, information including at least a throttle position of an accelerator pedal (throttle), the rate of increase of the throttle position, and the engine speed is input to the ECU 5. The ECU 5 determines whether deceleration enough to allow regeneration occurs based on the input information, and whether regenerative power is acceptable by the battery 3 based on the calculated SOC of the battery 3.

If it is determined that deceleration enough to allow regeneration occurs, and regenerative power is acceptable by the battery 3, the ECU 5 determines that regeneration should be carried out in step S110. If it is determined that the SOC of the battery 3 has reached the upper limit of the allowable SOC range, the ECU 5 determines that regeneration should not be carried out in step S110.

When it is determined that regeneration should be carrier out, the ECU 5 proceeds to step S112. The step S112 represents a subroutine for determining power generation torque during regeneration. Specifically, in step S112 (the subroutine), the ECU 5 computes power generation torque Tr during regeneration, which the alternator 2 should generate, based on the engine speed, the vehicle speed, battery acceptable power and the like. The ECU 5 sets the power generation torque Tr to a next instruction torque value Ti that that the ECU 5 should instruct next. Subsequently, the ECU 5 sends the instruction torque value Ti to the power-generation control apparatus 1C (the computing unit 300) in step S114.

In contrast, if it is determined that regeneration should not be carried out in step S110, the ECU 5 proceeds to step S116. The ECU 5 determines whether the power-generation control apparatus 1C (the alternator 2) should operate in the non-power generation mode in step S116.

In the fourth embodiment, if the overcharged power in the battery 3 exceeding a predetermined optimum SOC due to excessive power generation of the alternator 2 during regeneration after deceleration is equal to or more than a predetermined value, the ECU 5 determines that the power-generation control apparatus 1C (the alternator 2) should operate in the non-power generation mode in step S116. The operation of the power-generation control apparatus 1C in the non-power generation mode allows the SOC of the battery 3 to immediately return to the predetermined optimum SOC. This also permits a next regeneration. Note that the operation of the power-generation control apparatus 1C in the non-power generation mode can be prevented except for a predetermined period immediately after deceleration.

In step S116, if it is determined that the power-generation control apparatus 1C (the alternator 2) should operate in the non-power generation mode (the determination in step S116 is YES), the ECU 5 sets the instruction torque value Ti to zero in step S118, sending the instruction torque value Ti to the power-generation control apparatus 1C in step S120.

In step S116, if it is determined that the power-generation control apparatus 1C (the alternator 2) should not operate in the non-power generation mode (the determination in step S116 is NO), the ECU 5 proceeds to step S122 and determines whether preparations for torque control should be made using a plurality of criteria for determination. In the fourth embodiment, as one of criteria, the ECU 5 determines that preparations for torque control should be made when the SOC of the battery 3 is lower by a predetermined value than the lower limit of a predetermined suitable SOC range (normal SOC range) while the power-generation control apparatus 1C operates in the non-power generation mode (see S122a in step S122).

In step S122, if it is determined that preparations for torque control should be made (the determination in step S122 is YES), the ECU 5 sends the torque-control enabling signal to the power-generation control apparatus 1C in step S124. The torque-control enabling signal causes the apparatus 1C to shift to a torque-control preparation mode.

In contrast, if it is determined that preparations for torque control should not be made (the determination in step S122 is NO), the ECU 5 proceeds to step S126. In step S126 and the later step S128, the ECU 5 causes the power-generation control apparatus 1C to execute power generation torque control. Specifically, in the fourth embodiment, the ECU 5 calculates power generation torque using a running-torque instruction value to be delivered to the wheels, engine-generated torque, and engine load torque except for the alternator 2, and sets the calculated power generation torque as an instruction torque value Ti in step S128. Subsequently, the ECU 5 sends the instruction torque value Ti to the power-generation control apparatus 1C (the computing unit 300) in step S128.

Note that the torque-instruction control routine is called from the main routine of the ECU 5 to be executed thereby every predetermined routine execution period.

A change of the power-generation torque and that of the output voltage over time during the transition from the non-power generation period set forth above to the torque control period based on the torque-instruction control routine set forth above will be described hereinafter using a time chart illustrated in FIG. 8.

Figure 8:
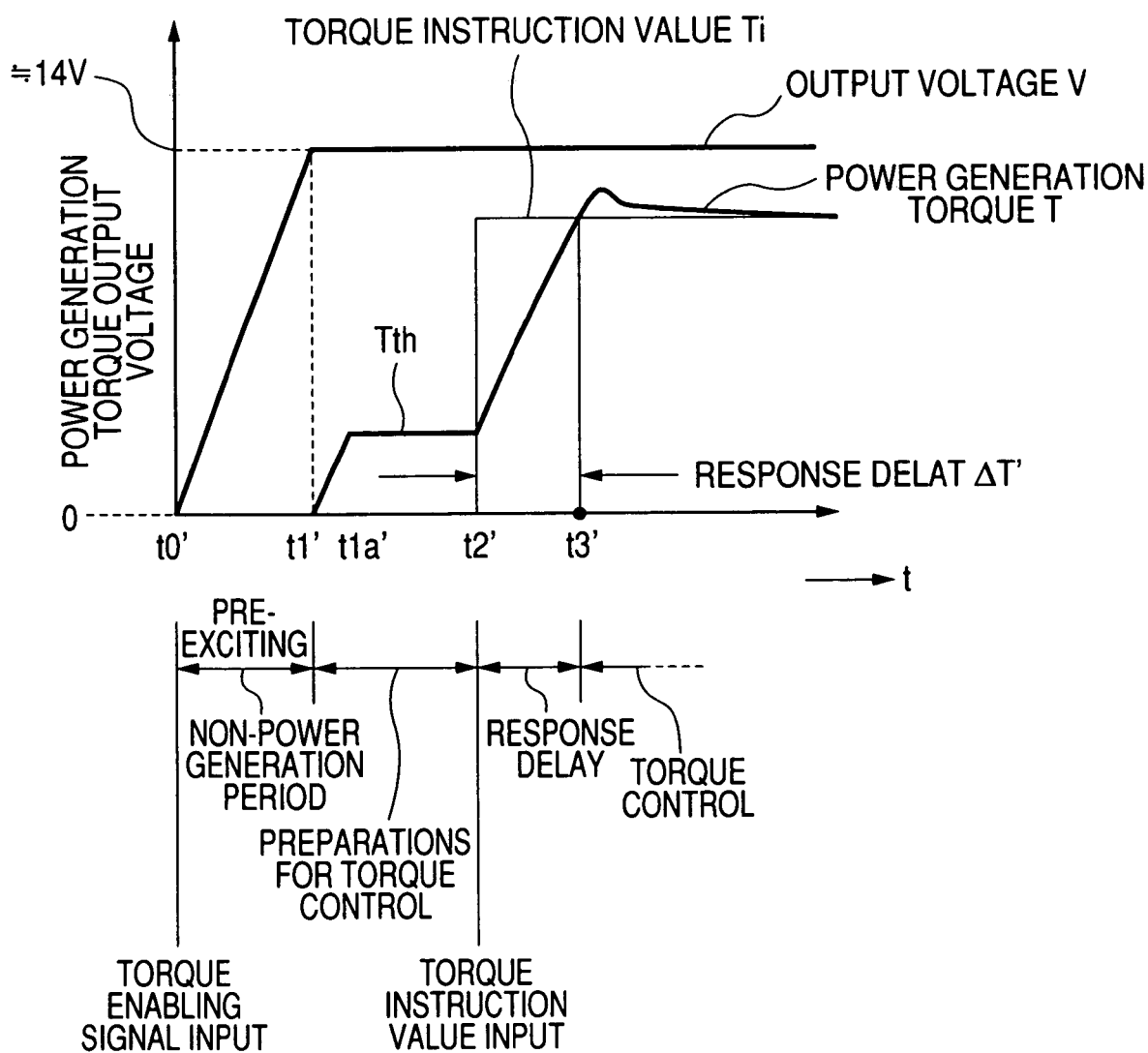
FIG. 8 is a time chart schematically illustrating a change of the power-generation torque and that of the output voltage over time during a transition from a non-power generation period to a torque control period according to the fourth embodiment of the present invention.

Referring to FIG. 8, reference character t0' represents a point of time when the torque control enabling signal is input to the power-generation control apparatus 1C (the computing unit 300) from the ECU 5 while the apparatus 1C operates in the non-power generation mode. From the point of time t0', the computing unit 300 has controlled the exciting current $I_f$ based on the predetermined small threshold torque value Tth as the instruction torque value Ti (see steps S100, S102, S104, and S106 of FIG. 6, and steps S110, S116, S118, and S120 of FIG. 7).

This allows the output voltage of the alternator 2 to increase so as to reach a predetermined battery-chargeable voltage of, for example, 14 V at a point of time t1' in the non-power generation mode.

In addition, this allows the exciting winding 204 to be pre-excited based on the control of the exciting current $I_f$ so that the excited level of the exciting winding 204 increases during the non-power generation period (t1'-t0'. As a result, it is possible to generate the predetermined small threshold torque value Tth as the power generation torque T at a point of time t1a' immediately after the point of time t1' at the end of the non-power generation period (see FIG. 8).

Specifically, after the point of time t1', the alternator 2 can charge the battery 3 so that the power generation torque T gradually increases based on the excited level of the exciting winding 204. After the power generation torque T reaches the predetermined small threshold torque value Tth at the point of time t1a', the computing unit 300 has carried out the PWM feedback control of the exciting current $I_f$ based on the predetermined small threshold torque value Tth as the instruction torque value Ti. This allows the power-generation torque T to be maintained to the predetermined small threshold torque value Tth for the period (t2'-t1') of preparations for torque control in a torque-control preparation mode (see steps S100, S102, S104, and S106 of FIG. 6).

When the instruction torque value Ti at a predetermined value shifted from zero is sent from the ECU 5 to the computing unit 300 at a point of time t2' (see steps S110, S116, S122, S126, and S128 of FIG. 7), the computing unit 300 controls the duty cycle of the exciting current $I_f$, thereby gradually increasing it (see steps S100, S108, and S106 of FIG. 6). Note that, because of high inductance of the exciting winding 204, elapse of a period ΔT'(=t3'-t2') is required until the power-generation torque T increases up to the instruction torque value Ti. The period ΔT' represents a predetermined response delay between the sending timing of the instruction torque value Ti and the timing at which the power-generation torque T reaches the instruction torque value Ti.

After the point of time t3', a sufficiently great amount of the exciting current has flowed through the exciting winding 204, which allows the computing unit 300 to carry out the torque control set forth above.

Figure 9:
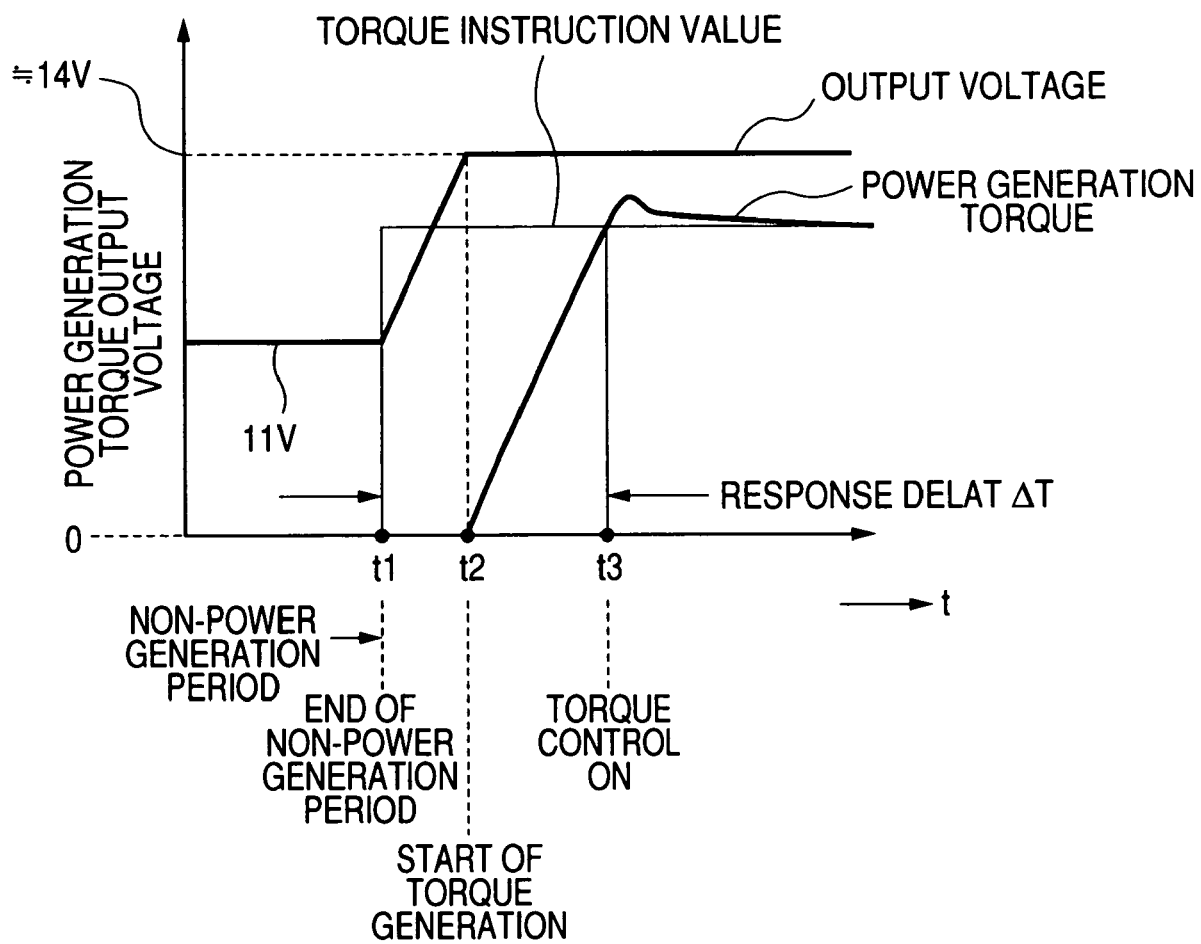
FIG. 9 is a time chart schematically illustrating a change of the power-generation torque and that of the output voltage over time during a transition from a non-power generation period to a torque control period according to the Patent Publication No. 2003-244998.

For comparison, a change of a power-generation torque and that of an output voltage over time during a transition from a non-power generation period to a torque control period based on control disclosed in the Patent Publication No. 2003-244998 are illustrated in FIG. 9.

As illustrated in FIG. 9, for a non-power generation period up to a point of time t1, a small magnitude of exciting current is caused to flow through an exiting winding so that an output voltage (strictly peak value) of an alternator is set to 11 V. Because the output voltage of the alternator does not reach a predetermined battery-chargeable voltage of 14 V, the power-generation torque and the output current are however kept to zero.

When an ECU sets up a torque control of the alternator at the point of time t1 during the non-power generation period, a significantly great amount value as an instruction torque value is sent from the ECU to the alternator, the alternator carries out PWM feedback control of the exciting current to increase the exciting current. This allows the output voltage to increase, permitting the alternator to transmit the output current at a point of time t2, in other words, the power-generation torque to increase over zero. Thereafter, the exciting current further increases with increase of the power-generation torque, allowing the power-generation torque to reach the torque instruction value at a point of time t3.

Specifically, in the transition from the non-power generation period to the torque control period according to the Patent Publication, a response delay ΔT (t3−t1) from the timing t1 of sending the instruction torque value to the alternator to the timing t3 at which the alternator returns to the torque control appears due to mainly high inductance of the exciting winding 204 even through the exciting current is continuously sent through the exciting winding.

In contrast, during the transition from the non-power generation period to the torque control period according to the fourth embodiment, during a most part of the non-power generation period, it is possible to shut off supply of the exciting current through the exciting winding 204, thereby reducing wasted power loss and preventing the exciting winding 204 from generating heat or rising in temperature.

In addition to achieving the effects, the pre-exciting with respect to the exciting winding 204 is started from the point of time t0' immediately after the point of time t0' at the end of the non-power generation period, which is estimated based on, for example, the operation in step S116. This allows the exciting winding 204 to be pre-excited based on the control of the exciting current $I_f$ so that the excited level of the exciting winding 204 increases during the non-power generation period (t1'−t0').

Therefore, even if the instruction torque value Ti at a predetermined value shifted from zero is sent from the ECU 5 to the computing unit 300 at a point of time t2', it is possible to immediately increase the exciting current $I_f$ up to a value corresponding to the instruction torque value Ti. This is because the predetermined small threshold torque value Tth has been generated as the power generation torque T at the point of time t1a' immediately after the point of time t1' at the end of the non-power generation period (see FIG. 8).

As described above, in the forth embodiment, even when the ECU 5 starts to cay out the torque control at the point of time t2' so as to send the instruction torque value Ti corresponding to a great amount of torque to the computing unit 300, the computing unit 300 can actually generate the power generation torque T at the point of time t3'. Specifically, in the fourth embodiment, it is possible to reduce the response delay ΔT' (=t3'−t2') due to high inductance of the exciting winding 204 as compared with the conventional response delay ΔT (t3−t1) illustrated in FIG. 9.

Accordingly, in the fourth embodiment, it is possible to reduce the response delay during the transition from the non-power generation period to the torque control period. This can carry out the torque-base control for generating the running torque using the power generation torque with high and detailed response to the driver's demands even if the power generation control apparatus 1C (alternator 2) operates in the non-power generation mode.

In addition, in the fourth embodiment, the non-power generation control allows the excessively charged power in the battery 3 based on the regeneration before the non-power generation control to be immediately and effectively consumed, making it possible to immediately address the next regeneration.

Moreover, it is unnecessary to cause the exciting current to flow through the exciting winding 204 except for immediately before the start of the torque control during the non-power generation period, making it possible to reduce wasted power loss and prevent the exciting winding 204 from rising in temperature.

The present invention is not limited to each of the first to fourth embodiments set forth above, various modifications of the present invention can be made within the scope of the present invention, As a first modification, in each of the first to third embodiments, at least part of the functions of the efficiency calculating unit and/or the torque calculating unit can be installed in the ECU. Similarly, in the fourth embodiment, at least part of the functions of the computing unit 300 can be installed in the ECU.

For example, the information including the revolution, the exciting current, the output current, and the output voltage measured by the power generation control apparatus 1C can be sent to the ECU 5 in accordance with the serial communication protocols. In the ECU 5, the torque calculation and the duty determining operations can be executed by the ECU 5, and thereafter, the determined duty can be sent to the power generation control apparatus 1C.

Figure 10:
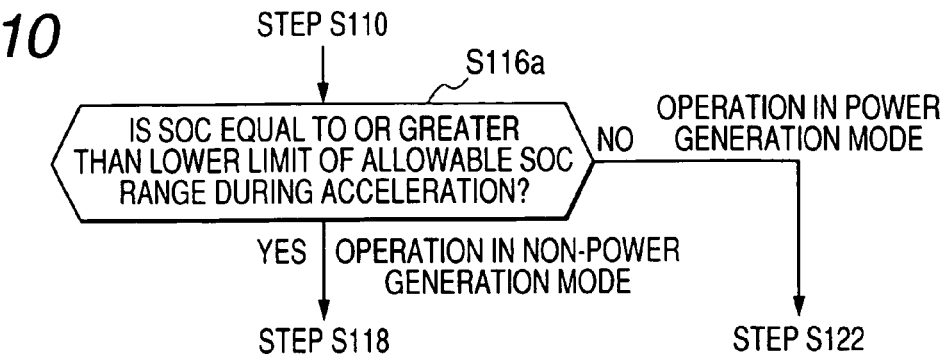
FIG. 10 is a flowchart schematically illustrating part of a modification of the power-generation control routine of an ECU illustrated in FIG. 7.

In the fourth embodiment, the ECU 5 causes the power-generation control apparatus 1C to operate in the non-power generation mode (to perform the non-power generation operation) if the overcharged power in the battery 3 exceeding the predetermined optimum SOC during regeneration after deceleration is equal to or more than the predetermined value in step S116. In the present invention, as a second modification, in addition to the timing, the ECU 5 can cause the power-generation apparatus 1C to perform the non-power generation operation when the SOC of the battery 3 is equal to or greater than the lower limit of the allowable SOC range during acceleration (the determination is step S116a is YES in FIG. 10).

In this case, the start point of time of the preparations for torque control is set to a point of time at which the acceleration of the vehicle exceeds a predetermined value. The determination whether the acceleration of the vehicle exceeds the predetermined value can be carried out in the operation of step S122 (torque-control preparation mode start determining step). It is also natural that the ECU 5 causes the power-generation apparatus 1C to perform the non-power generation operation when the SOC of the battery 3 is lower than the lower limit of the allowable SOC range by the predetermined value during the non-power generation period (see step S122).

Figure 11:
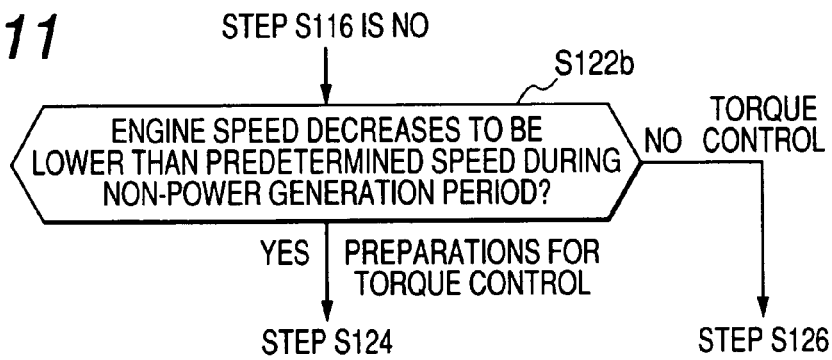
FIG. 11 is a flowchart schematically illustrating part of a modification of the power-generation control routine of an ECU illustrated in FIG. 7.

In the fourth embodiment, in step S122, the end of the non-power generation period is estimated based on the recovery condition of the SOC of the battery 3 so as to determine whether preparations for torque control should be made based on the estimated result (see step S122a in FIG. 7). In the present invention, as a third modification, in place of or in addition to the determination, when it is determined that the engine speed decreases to be lower than a predetermined speed during the non-power generation period (the determination is YES in step S122b of FIG. 11), the ECU 5 sends the torque-control enabling signal to the power-generation control apparatus 1C. The predetermined speed is preferably a speed equal to or close to an engine idle speed.

This causes the apparatus 1C to shift to the torque-control preparation mode, making it possible for the power generation control apparatus 1C to execute the torque control in order to prevent the engine speed from hunting after the torque-control preparation mode.

When the engine speed is low, great torque fluctuations appear due to the compression and expansion of the engine. These torque fluctuations have an influence on the alternator 2 so that the hunting of the engine speed may occur. In this case, as set forth above, when the engine speed falls down up to a level close to the engine idle speed, the ECU 5 sends the torque-control enabling signal to the power-generation control apparatus 1C. This causes the apparatus 1C to shift to the torque-control preparation mode. This allows the apparatus 1C to prepare for control of the power-generation torque within a predetermined wide range so as to have the reverse of the waveform of the engine-torque fluctuations.

As described above, in the third modification, use of determination of whether the engine speed decreases to be equal to or lower than a predetermined level of the engine speed as determination of whether preparations for torque control should be made allows reduction of the response delay in addition to suppression of the hunting of the engine speed. This is because, if preparations for torque control are made in the engine's low-speed area, a great amount of exciting current is required to obtain the power-generation torque with the same level as in the case of the engine's high-speed area, increasing the response delay.

Figure 12:
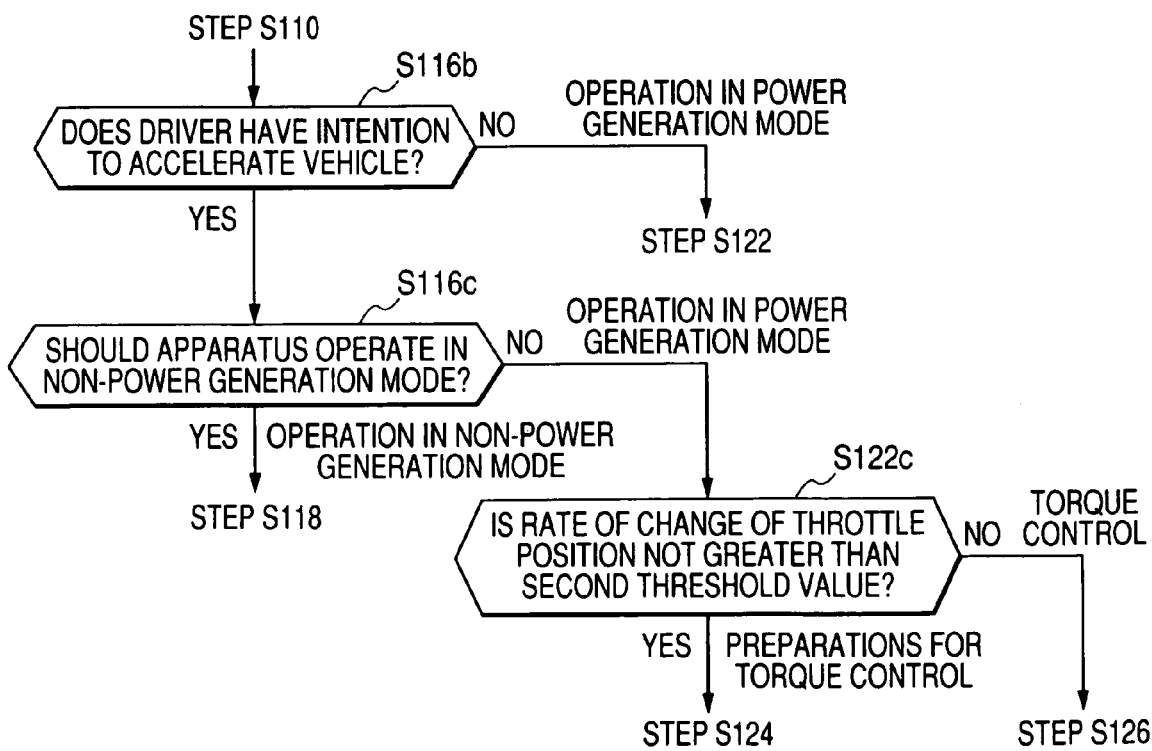
FIG. 12 is a flowchart schematically illustrating part of a modification of the power-generation control routine of an ECU illustrated in FIG. 7.

As a fourth modification of the fourth embodiment, as the operation in step S116, the ECU 5 can determine whether the driver has an intention to accelerate the vehicle (see step S116b of FIG. 12). If it is determined that the driver has an intention to accelerate the vehicle (the determination in step S116b is YES), the ECU 5 can determine whether the power-generation control apparatus 1C (the alternator 2) should operate in the non-power generation mode in step S116c of FIG. 12. In other words, when the determination in step S116b is affirmative, the ECU 5 can determine whether to maintain the non-power generation period or start it in step S116c. If it is determined that the non-power generation period is not maintained or started, the ECU 5 proceeds to step S122 and determines whether preparations for torque control should be made.

More specifically, in step S116b, the ECU 5 for example determines whether the rate of increase of the throttle position (or the vehicle acceleration rate) exceeds a predetermined first threshold value. Note that the vehicle acceleration rate is synonymous with a wheel-speed acceleration rate, and the rate of increase of the throttle position is synonymous with a rate of increase of acceleration pedal depression.

If it is determined that the rate of increase of the throttle position exceeds the first threshold value, the ECU 5 determines the start of vehicle accelerating period, thereby causing the power generation control apparatus 1C to operate in the non-power generation mode. This allows driving response, in other words, acceleration feeling to be improved.

In addition, in step S122c of FIG. 12, the ECU 5 for example determines whether the rate of increase of the throttle position is not greater than a predetermined second threshold value. If it is determined that the rate of change of the throttle position is not greater than the second threshold value, the ECU 5 determines that the vehicle acceleration will be terminated soon, sending the torque-control enabling signal to the power-generation control apparatus 1C in step S124.

This allows power generation to be started immediately after a torque assist period during the non-power generation period, making it possible to use engine torque being consumed by vehicle acceleration as power generation.

Note that, if the vehicle acceleration rate increases even though the increase of acceleration pedal depression or its rate is kept small, such as if the vehicle for example runs down a downhill, the vehicle acceleration state is not the driver's intention. In such a case, the ECU 5 preferably does not cause the power generation control apparatus 1C to operate in the non-power generation mode, but causes it to operate in the regeneration mode.

In each of the first to fourth embodiments, the computing unit 300 executes feedback PWM control of the duty cycle of each pulse in the PWM signal to determine the value of the exciting current $I_f$, the present invention is not limited to the structure. Specifically, in the present invention, as a fourth modification, the computing unit 300 can compute the value of the exciting current corresponding to the power generation torque that the alternator 2 should generate. In addition, the computing unit 300 can execute open control to directly control the duty cycle of each pulse in the PWM signal; this duty cycle corresponds to the computed value of the exciting current $I_f$. This makes it possible to speed up the power-generation torque control of the alternator 2.

Note that the open control of the duty cycle of each pulse in the PWM signal may include fluctuations depending on change of the resistance value of the exciting winding in temperature. It is therefore preferable that, as a sixth modification, the computing unit 300 executes the open control of the duty cycle of each pulse in the PWM signal when the instruction torque value Ti sent from the ECU 5 suddenly widely changes, and otherwise, executes feedback PWM control of the duty cycle of each pulse in the PWM signal.

Note that, because the exciting winding has high inductance, as illustrated in FIG. 8, the response delay appears until the exciting current $I_f$ actually reaches the value corresponding to the instruction torque value Ti.

In the control of the duty cycle of each pulse in the PWM signal, as a seventh modification, when it is necessary to widely change the duty cycle, in other word, the current power generation torque is widely different from the instruction torque value Ti, the computing unit 300 can widely change the duty cycle of each pulse in the PWM signal from its optimum vale in the direction to reduce the difference first. Next, the computing unit 300 can change small the duty cycle of each pulse in the PWM signal from its optimum vale in the direction to increase the difference. This allows the response of the duty cycle to the suddenly wide change of the exciting current $I_f$ to be improved.

In each of the first to fourth embodiments, the alternator 2 can generate power. In the present invention, various types of power generators can be employed. Particularly, in place of the alternator 2, a motor-generator can be employed. This allows further excellent torque base control to be clearly brought to realization.

In the fourth embodiment, in order to determine the battery state, the SOC is used as a parameter indicative of the state of the battery 3, but, in the present invention, another one of parameters indicative of the state of the battery 3 can be used. For example, an open voltage of the battery 3 obtained by subtracting a battery interior voltage drop from the battery voltage can be used as another one of the parameters.

While there has been described what is at present considered to be the embodiments and modifications of the present invention, it will be understood that various modifications which are not described yet may be made therein, and it is intended to cover in the appended claims all such modifications as fall within the true spirit and scope of the invention.

What is claimed is:

1. An apparatus for calculating power generation torque of a power generator with a portion in which an exciting winding is provided, the power generator generating power based on rotation of the portion while an exciting current is supplied to the exciting winding, the apparatus comprising:
    a first detecting unit configured to detect the number of revolutions of the power generator;
    a second detecting unit configured to detect an output voltage of the power generator;
    a third detecting unit configured to detect an output current of the power generator; and
    a torque calculating unit configured to calculate power generation torque based on the detected number of revolutions of the power generator, the detected output voltage, and the detected output current using relationship information, the relationship information representing a relationship between the power generation torque and each of the number of revolutions of the power generator, the output voltage, and the output current.

2. An apparatus according to claim 1, further comprising a fourth detecting unit configured to detect the exciting current, the relationship information representing a relationship between the power generation torque and each of the number of revolutions of the power generator, the output voltage, the output current, and the exciting current, and wherein the torque calculating unit comprises:
    an efficiency calculating module configured to calculate an efficiency of the power generator based on the detected number of revolutions of the power generator, the detected output voltage, the detected output current, and the detected exciting current using the relationship information, and
    a torque calculating module configured to calculate the power generation torque based on the calculated efficiency.

3. An apparatus according to claim 2, wherein the relationship information is an approximate equation indicative of the relationship between the power generation torque and each of the number of revolutions of the power generator, the output voltage, the output current, and the exciting current.

4. An apparatus according to claim 3, wherein the approximate equation includes a term indicative of copper loss of a stator winding of the power generator, the exciting winding allowing magnetic flux to be induced in the stator winding, the copper loss of the stator winding depending on the output current.

5. An apparatus according to claim 4, wherein the term indicative of copper loss of a stator winding is proportional to the second order of the output current.

6. An apparatus according to claim 1, wherein the relationship information includes a map representing a relationship between the power generation torque and each of the number of revolutions of the power generator, the output voltage, and the output current, and wherein the torque calculating unit comprises:
    an efficiency calculating module configured to calculate an efficiency of the power generator based on the detected number of revolutions of the power generator, the detected output voltage, and the detected output current using the map, and
    a torque calculating unit configured to calculate the power generation torque based on the calculated efficiency.

7. An apparatus according to claim 1, wherein the relationship information is a table indicative of the relationship between the power generation torque and each of the number of revolutions of the power generator, the output voltage, and the output current, and the torque calculating unit is configured to refer the table based on the detected number of revolutions of the power generator, the detected output voltage, and the detected output current to calculate the power generation torque based on the referred result.

8. An apparatus for calculating power generation torque of a power generator with a portion in which an exciting winding is provided, the power generator generating power based on rotation of the portion while an exciting current is supplied to the exciting winding, the apparatus comprising:
    a first detecting unit configured to detect the number of revolutions of the power generator;
    a second detecting unit configured to detect an output voltage of the power generator;
    a third detecting unit configured to detect a physical value depending on a temperature of a stator winding, the exciting winding allowing magnetic flux to be induced in the stator winding;
    a fourth detecting unit configured to detect the exciting current; and
    a torque calculating unit configured to calculate power generation torque based on the detected number of revolutions of the power generator, the detected output voltage, the detected exciting current, and the detected physical value using relationship information, the relationship information representing a relationship between the power generation torque and each of the number of revolutions of the power generator, the output voltage, the exciting current, and the physical value with respect to each temperature of the stator winding within a predetermined permissible temperature range.

9. An apparatus for calculating power generation torque of a power generator with a portion in which an exciting winding is provided, the power generator generating power based on rotation of the portion while an exciting current is supplied to the exciting winding, the apparatus comprising:
    a first detecting unit configured to detect the number of revolutions of the power generator;
    a second detecting unit configured to detect an output voltage of the power generator;
    a third detecting unit configured to detect an output current of the power generator;
    a fourth detecting unit configured to detect a physical value depending on a temperature of a stator winding, the exciting winding allowing magnetic flux to be induced in the stator winding; and
    a torque calculating unit configured to calculate power generation torque based on the detected number of revolutions of the power generator, the detected output voltage, the detected output current, and the detected physical value using relationship information, the relationship information representing a relationship between the power generation torque and each of the number of revolutions of the power generator, the output voltage, the output current, and the physical value with respect to each temperature of the stator winding within a predetermined permissible temperature range.

10. A method of calculating power generation torque of a power generator with a portion in which an exciting winding is provided, the power generator generating power based on rotation of the portion while an exciting current is supplied to the exciting winding, the method comprising:

detecting the number of revolutions of the power generator;

detecting an output voltage of the power generator;

detecting an output current of the power generator; and calculating power generation torque based on the detected number of revolutions of the power generator, the detected output voltage, and the detected output current using relationship information, the relationship information representing a relationship between the power generation torque and each of the number of revolutions of the power generator, the output voltage, and the output current.

* * * * *